Sept. 24, 1929.    J. NEALE    1,729,517
ELECTRICAL MEASURING INSTRUMENT
Filed Feb. 13, 1929
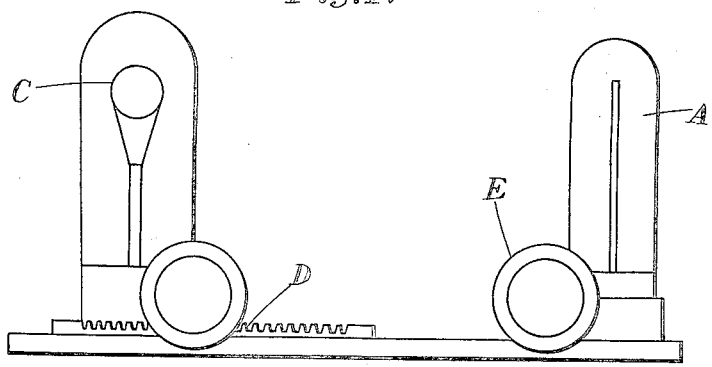
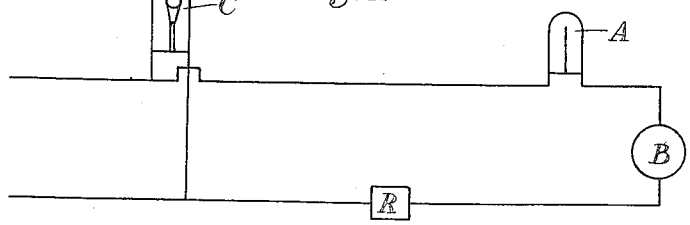
INVENTOR
John Neale
BY
Richard E. Babcock
ATTORNEY Patented Sept. 24, 1929

1,729,517

UNITED STATES PATENT OFFICE

JOHN NEALE, OF LONDON, ENGLAND

ELECTRICAL MEASURING INSTRUMENT

Application filed February 13, 1929, Serial No. 339,729, and in Great Britain December 1, 1927.

This invention relates to an improved instrument for measuring electrical pressures, currents or resistances, and particularly small variations in such quantities. Where sensitivity in recording small variations has hitherto been secured in instruments for this purpose, it has involved extreme delicacy of construction and consequent expense. The object of the present invention is to provide an instrument by which such sensitivity is secured by a different principle without involving such delicacy in construction.

According to the invention the essential elements of my improved instrument are comprised by an electrically-actuated illuminating means and a light-sensitive element influenced thereby, the two elements being adjustable in relation to each other by suitable operating means such as a rack and pinion, a measuring instrument of some kind, and connections so arranged that the circuits of the illuminating means and the light sensitive element are in parallel and the instrument can be placed directly across ordinary electric supply mains.

In the accompanying drawing, in which my invention is illustrated in a more or less diagrammatic form:

Figure 1 represents a side elevation of an instrument embodying my invention; and Figure 2, a diagrammatic view thereof.

Referring to the drawing, the light sensitive element A is preferably that described and claimed in the specification of my British copending patent application Ser. No. 283,458, filed June 6, 1928, and this in series with a measuring instrument B is arranged in parallel with the ordinary electric lamp C. A drop in the voltage, for example, of the common supply mains is followed by a corresponding drop in the current flowing through the lamp and element. But a drop in the current flowing through the lamp means a decrease in its illumination value, and consequently an increase in the resistance of the light-sensitive bridge. This in turn leads to a further decrease in current in the light sensitive element circuit, which is thus subject to a double action due to a single drop in value in the main supply circuit. It is therefore possible to secure much greater sensitiveness in the measuring instrument as regards fluctuations in electrical values.

The lamp is preferably run well below its full illuminative power, as fluctuations in voltage or the like then produce their maximum effect on the light-sensitive element.

For adjusting the resistance of the light sensitive element I provide rough and fine adjustments as follows. In the circuit of the light sensitive element I provide a resistance R which gives a rough adjustment and a finer adjustment can then be secured by racking the lamp to and from the light sensitive element by means of the rack and pinion mechanism D. The very finest adjustment can then be secured by rotating the light sensitive element by the worm-wheel and worm device E, so that its projected area in relation to the lamp is very gradually altered. It is found that this gives a very delicate adjustment.

I claim:

1. In combination, a series circuit including a light sensitive element and an electrical measuring instrument, and means for projecting light rays on said element, said means including electrical connections bridging said series circuit and controlling the amount of light projected on said element in accordance with the variations in the electric current passing through said series circuit, whereby the current flowing through the light sensitive element is always dependent upon two factors, the voltage of the electrical supply and the amount of light projected by said light projecting means on said element in consequence of said voltage of the electrical supply.

2. In combination, a series circuit including a light sensitive element and an electrical measuring instrument, and an electrical source of light which bridges said series circuit and controls said element.

3. In combination, a series circuit including a light sensitive element and an electrical measuring instrument, an electrical source of light which bridges said series circuit and controls said element, and means for varying the distance between said electrical source of light and said element.

4. In combination, a series circuit including a light sensitive element and an electrical measuring instrument, an electrical source of light which bridges said series circuit and controls said element, and means for turning said element about a fixed axis.

5. In combination, a series circuit including a light sensitive element and an electrical measuring instrument, an electrical source of light which bridges said series circuit and controls said element, means for varying the distance between said electrical source of light and element, and means for turning said element about its axis.

JOHN NEALE.